(12) United States Patent
Chemishkian et al.

(10) Patent No.: US 8,761,706 B2
(45) Date of Patent: Jun. 24, 2014

(54) PASSIVE RF DEVICES THAT COMMUNICATE USING A WIRELESS NETWORK PROTOCOL

(75) Inventors: Sergey Chemishkian, San Jose, CA (US); Jonathan J. Hull, San Carlos, CA (US)

(73) Assignee: Ricoh Company, Ltd., Tokyo (JP)

( * ) Notice: Subject to any disclaimer, the term of this patent is extended or adjusted under 35 U.S.C. 154(b) by 264 days.

(21) Appl. No.: 13/216,810

(22) Filed: Aug. 24, 2011

(65) Prior Publication Data

US 2013/0051375 A1    Feb. 28, 2013

(51) Int. Cl.
*H04B 1/18* (2006.01)
*H04W 4/00* (2009.01)

(52) U.S. Cl.
USPC .................. 455/290; 455/292; 370/338

(58) Field of Classification Search
USPC .............. 370/338; 455/290, 292, 41.1–41.3
See application file for complete search history.

(56) References Cited

U.S. PATENT DOCUMENTS

| | | | |
|---|---|---|---|
| 7,075,412 B1 | 7/2006 | Reynolds | |
| 7,477,917 B2 * | 1/2009 | Rofougaran et al. | 455/552.1 |
| 2003/0007473 A1 | 1/2003 | Strong | |
| 2003/0104848 A1 | 6/2003 | Brideglall | |
| 2004/0176032 A1 * | 9/2004 | Kotola et al. | 455/41.2 |
| 2004/0203352 A1 * | 10/2004 | Hall et al. | 455/41.1 |
| 2005/0207381 A1 | 9/2005 | Aljadeff | |
| 2006/0111051 A1 * | 5/2006 | Barink et al. | 455/70 |
| 2006/0208896 A1 * | 9/2006 | Mason | 340/572.7 |
| 2007/0207732 A1 * | 9/2007 | Rofougaran et al. | 455/41.1 |
| 2007/0207743 A1 * | 9/2007 | Rofougaran et al. | 455/73 |
| 2008/0220721 A1 * | 9/2008 | Downie et al. | 455/41.3 |
| 2009/0009295 A1 * | 1/2009 | Rofougaran | 340/10.1 |
| 2009/0189739 A1 * | 7/2009 | Wang | 340/10.1 |

* cited by examiner

*Primary Examiner* — Thai Hoang
(74) *Attorney, Agent, or Firm* — Duft Bornsen & Fettig LLP

(57) ABSTRACT

Passive RF devices are disclosed that communicate using a wireless network protocol. The device includes an antenna operable to receive a radio frequency (RF) signal from a RF source that transmits the RF signal based on a wireless network protocol. The device further includes circuitry operable to derive power from the RF signal. With the power derived from the RF signal, the circuitry is further operable to read data from a memory, to encode the data based on the wireless network protocol, and to modulate the RF signal to include the encoded data. The antenna is further operable to transmit the modulated RF signal based on the wireless network protocol for reception by the RF source or another passive RF device.

16 Claims, 3 Drawing Sheets

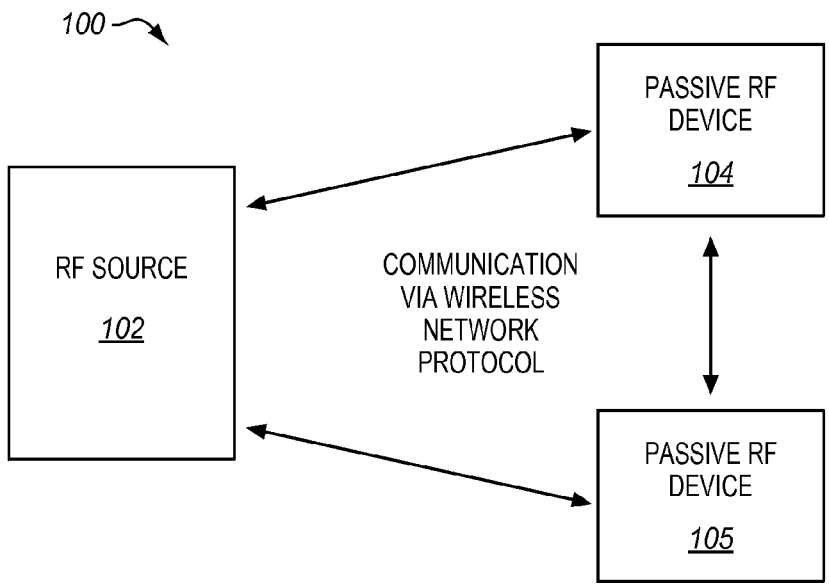
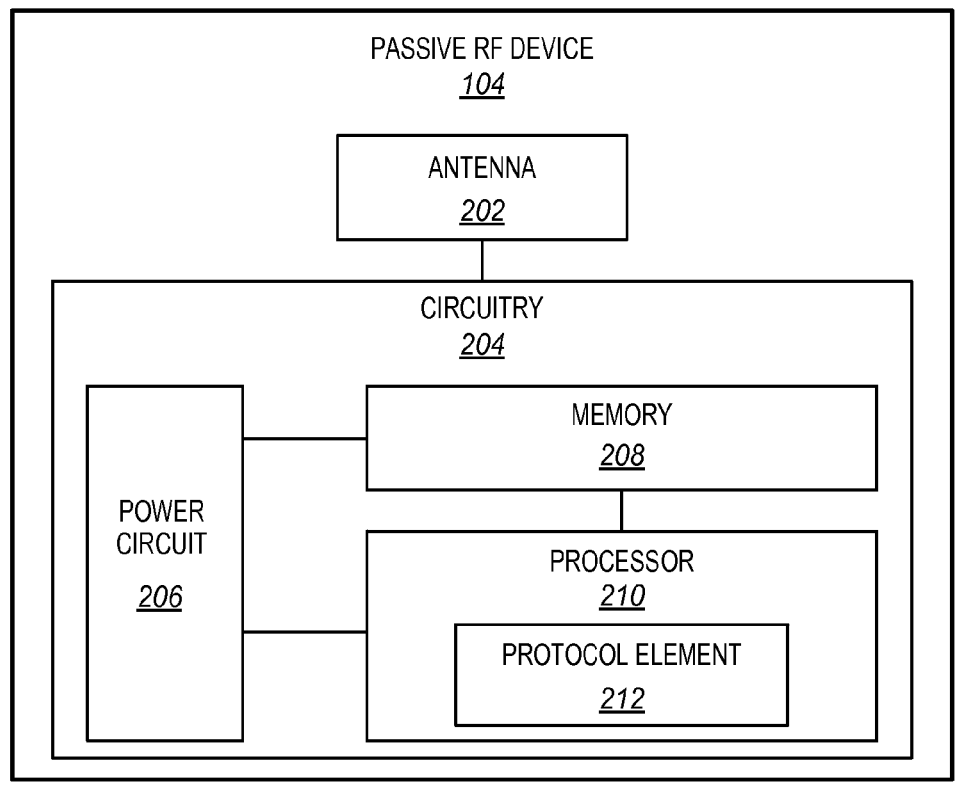

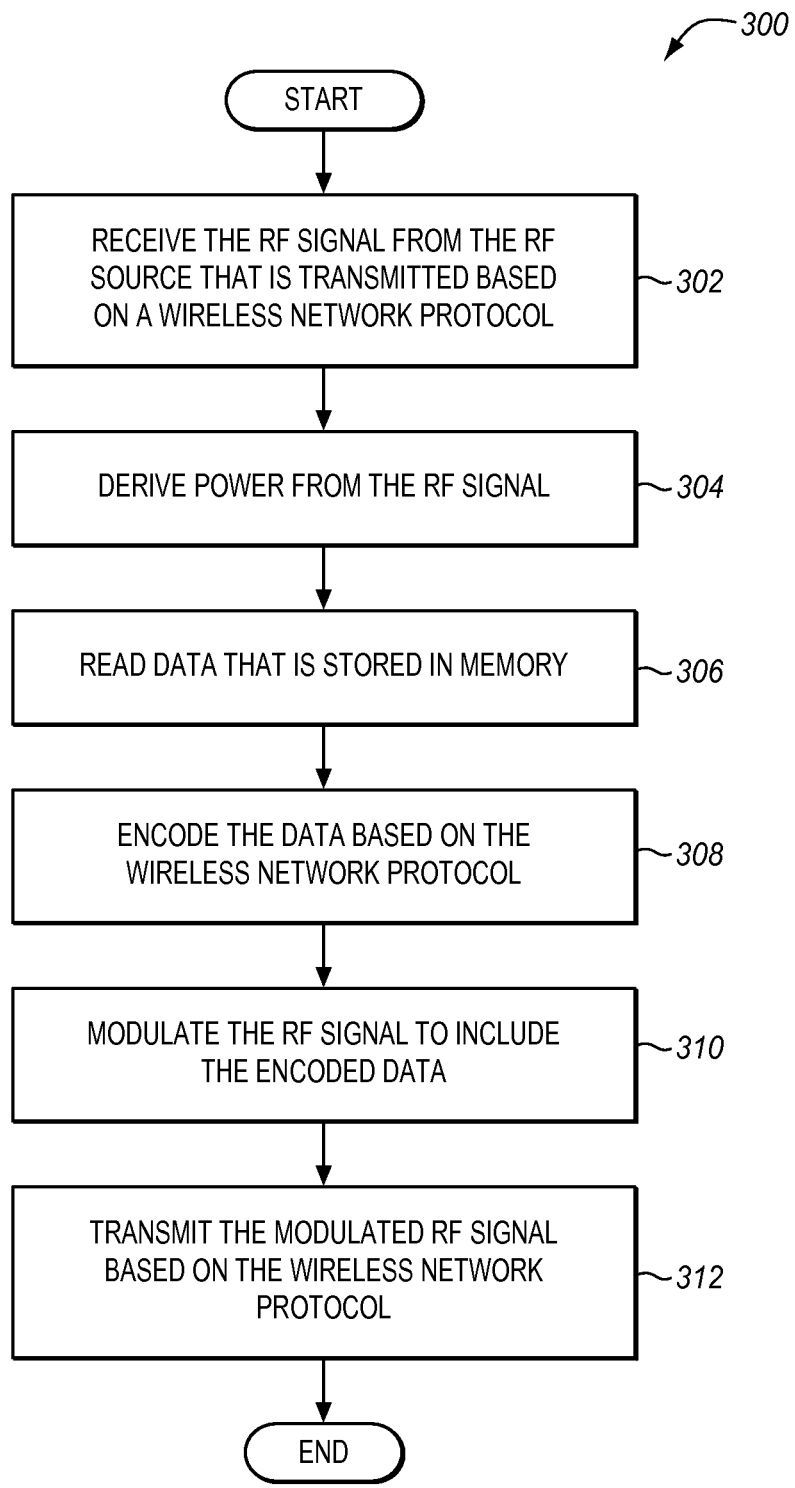

PASSIVE RF DEVICES THAT COMMUNICATE USING A WIRELESS NETWORK PROTOCOL

FIELD OF THE INVENTION

The invention relates to the field of passive Radio Frequency (RF) devices.

BACKGROUND

Radio Frequency Identification (RFID) refers to a process of transferring data over a Radio Frequency (RF) signal between a reader and a device that is attached to an object. RFID is commonly used for identifying and tracking objects. For example, RFID devices may be attached to objects in a warehouse so that inventory in the warehouse may be tracked. The RFID device, also referred to as an RFID tag, typically stores an identifier (ID) for an object in a memory. The RFID device reads the object ID from the memory, and broadcasts an RF signal that includes the object ID (e.g., the object ID is modulated on the RF signal). An RFID reader receives the RF signal and interprets the object ID from the RF signal.

Most RFID devices include an antenna that receives and transmits RF signals, and an integrated circuit that stores data and processes the RF signals. Some RFID devices also include a battery, and are referred to as active devices. Other RFID devices do not include a battery, and are referred to as passive devices. In a passive RFID device, the power for the integrated circuit is supplied by an RF signal supplied by the RFID reader. The antenna in the passive RFID device receives the RF signal broadcast from the RFID reader. The antenna has a coiled configuration which causes the RF signal to form an electromagnetic field in the antenna. The integrated circuit derives power from the electromagnetic field, which energizes the integrated circuit instead of a battery or some other power source. With the power supplied by the RF signal, the integrated circuit reads the data stored in memory, and modulates the stored data onto the RF signal. The antenna then transmits or reflects the modulated RF signal for reception by the RFID reader. The RFID reader senses the RF signal from the passive RFID device, and processes the data added to the RF signal.

SUMMARY

Embodiments described herein provide for an improved passive RF device that is able to communicate using a wireless network protocol. The passive RF device includes circuitry that is able to derive power from an RF signal that is transmitted from a RF source. The RF signals from the RF source are based on the wireless network protocol (e.g., IEEE 802.15.4 or IEEE 802.11). With the power derived from the RF signal, the circuitry is able to communicate with the RF source or other passive RF devices using the wireless network protocol. Thus, passive RF devices, such as RFID devices, may be implemented in a more effective and reliable manner by using the wireless network protocol for communication.

One embodiment includes a passive RF device. The device includes an antenna operable to receive a radio frequency (RF) signal from a RF source that transmits the RF signal based on a wireless network protocol. The device further includes circuitry operable to derive power from the RF signal. With the power derived from the RF signal, the circuitry is further operable to read data from a memory, to encode the data based on the wireless network protocol, and to modulate the RF signal to include the encoded data. The antenna is further operable to transmit the modulated RF signal based on the wireless network protocol for reception by the RF source or another passive RF device.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

FIG. 1 is a block diagram illustrating an RFID system in an exemplary embodiment.

FIG. 2 is a block diagram of a passive RF device in an exemplary embodiment.

FIG. 3 is a flow chart illustrating a method of operating a passive RF device to communicate using the wireless network protocol in an exemplary embodiment.

DESCRIPTION OF THE EMBODIMENTS

Figure 4:
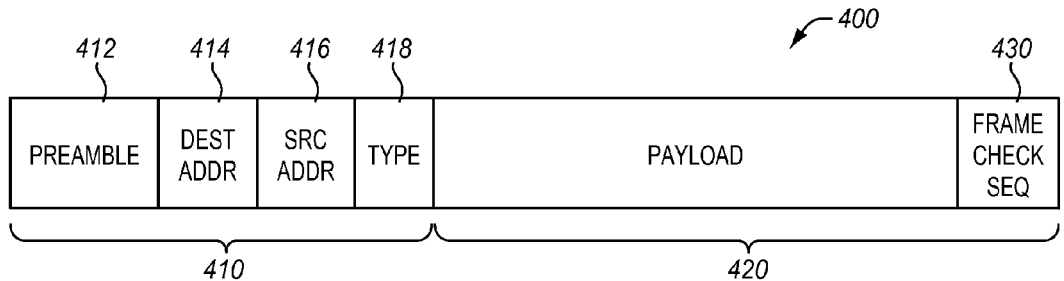
FIG. 4 illustrates a frame in an exemplary embodiment.

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

FIG. 1 is a block diagram illustrating an RFID system 100 in an exemplary embodiment. RFID system 100 includes an RF source 102 and passive RF devices 104-105. RF source 102 is an active device that transmits RF signals based on a wireless network protocol. A wireless network protocol defines a format for data being transmitted, and rules for transmission of the data. Examples of a wireless network protocol that may be used in RFID system 100 are IEEE 802.15.4, Zigbee, IEEE 802.11, Wi-Fi, etc. RF source 102 may include an RFID reader that is compliant with the wireless network protocol, or may include a wireless access point for a Personal Area Network (PAN), a Local Area Network (LAN), or another type of network that uses the wireless network protocol.

RF devices 104-105 are passive devices, meaning that they derive power from RF signals received from RF source 102 instead of from an active power source, such as a battery. Each RF device 104-105 is programmed with data, such as an identifier (ID) for an object. Using the power derived from the RF signal, an RF device 104 identifies its stored data, and encodes the data based on the wireless network protocol. RF device 104 then transmits the encoded data based on the wireless network protocol. The encoded data may be sent to RF source 102 or to another passive RF device (e.g., RF device 105).

FIG. 2 is a block diagram of passive RF device 104 in an exemplary embodiment. RF device 104 includes an antenna 202 and circuitry 204. Antenna 202 is operable to transmit and receive RF signals based on the wireless network protocol. Circuitry 204 includes a power circuit 206, a memory 208, and a processor 210. Power circuit 206 is operable to derive power from a RF signal received from RF source 102 through antenna 202. The power derived from power circuit 206 energizes circuitry 204 instead of a battery or some other active power source, which makes RF device 104 a passive device. Memory 208 is operable to store data, such as an identifier (ID) for an object. Memory 208 may store other programs or commands executable by processor 210, or any other desired data. Processor 210 is programmable to provide the desired functionality of RF device 104. One of the functions provided by processor 210 is to report the data that is stored in memory 208. Another one of the functions provided by processor 210 is to communicate with RF source 102 and/or RF device 105 using the wireless network protocol.

The protocol-based communication for RF device 104 is provided by a protocol element 212 within processor 210. Protocol element 212 as shown in FIG. 2 represents the function in RF device 104 for exchanging data based on the wireless network protocol (e.g., IEEE 802.15.4 or IEEE 802.11). As part of exchanging data, protocol element 212 is able to encode data based on the wireless network protocol for transmission to RF source 102 and/or RF device 105. Protocol element 212 is also able to decode data received from RF source 102 and/or RF device 105 based on the wireless network protocol.

Assume in FIG. 1 that RF source 102 transmits an RF signal based on the wireless network protocol while RF device 104 is in close proximity to RF source 102. FIG. 3 is a flow chart illustrating a method 300 of operating passive RF device 104 to communicate using the wireless network protocol in an exemplary embodiment. The steps of method 300 will be described with respect to RF device 104 of FIGS. 1-2, although one skilled in the art will understand that the methods described herein may be performed by other devices not shown. The steps of the methods described herein are not all inclusive and may include other steps not shown. The steps for the flow charts shown herein may also be performed in an alternative order.

In step 302, antenna 202 receives the RF signal from RF source 102. Again, the RF signal from the RF source 102 is based on the wireless network protocol. In step 304, power circuit 206 derives power from the RF signal. For example, antenna 202 may have a coiled configuration which causes the RF signal to form an electromagnetic field in antenna 202. Power circuit 206 may then derive the power from the electromagnetic field, which energizes circuitry 204.

With the power derived from the RF signal, processor 210 reads the data that is stored in memory 208 in step 306. Instead of simply modulating the data on the RF signal and transmitting the modulated RF signal, protocol element 212 encodes the data based on the wireless network protocol in step 308. The wireless network protocol defines how the data is structured or formatted for transmission into a data unit. For example, the wireless network protocol may define the structure of the data unit as including a header and an attached payload. The header may include fields for addressing, such as a source address and a destination address. The header may also include a field indicating a "type" for the data unit. For instance, if IEEE 802.15.4 is used as the wireless network protocol, then the type of data unit may be for data, an acknowledgement, a beacon, or a Media Access Control (MAC) command. If IEEE 802.11 is used as the wireless network protocol, then the type of data unit may be a User Datagram Protocol (UDP) packet or Transmission Control Protocol (TCP) packet.

One type of data unit used for lower-level networking protocols is a frame. One example of a frame is shown in FIG. 4. Frame 400 in FIG. 4 includes a header 410 that includes control and/or addressing information. In this embodiment, header 410 includes a preamble field 412, a destination address field 414, a source address field 416, and a frame type field 418. The destination address field 414 and source address field 416 may include MAC addresses for the destination and source of the frame 400, respectively. Frame 400 further includes a payload 420, which includes the actual data that is being transported, such as an object ID. Frame 400 also includes a frame check sequence 430 that is used for error checking. The structure of frame 400 in FIG. 4 is just one example, as the frames or other data units discussed herein may have other desired structures.

If IEEE 802.11 is used as the wireless network protocol, one type of data used for lower level networking is the Service Set Identifier (SSID). The SSID is a name that identifies a particular 802.11 wireless LAN and is defined as 2 to 32 8-bit bytes. The SSID is typically broadcast as an identifier by 802.11 servers so that clients can choose whether they should connect to that server. RF device 104 may encode the data in an SSID, and then modulate and transmit that data so that it's received by RF source 102 and passive RF device 105. The SSID may include an identifier for the device and the content of memory 208. For example, the identifier may be 3 bytes and the memory content may be 29 bytes. Or, the identifier may be 0 bytes and the entire 32 bytes may be used for the memory content. Or, the initial N bytes of the SSID may be allocated for a sequence number (e.g., 0, 1, 2, 3 for 4-bytes sequence of SSID's), N bytes for the maximum sequence number, and the subsequent 32-2N bytes for the memory content. Processor 210 may encode the content of memory 208 in successive SSID's in increasing order of sequence number, and repeatedly broadcast that sequence of SSID's. The receiver then reassembles the data encoded in the SSID's. For example, when transmitting a 75 byte message, three SSID's would be used and their byte patterns would look like: 02[30 byte payload], 12[30 byte payload], 22[15 bytes of payload data out of 30 that are available].

After the data is encoded in FIG. 3, processor 210 modulates the RF signal to include the encoded data in step 310. Antenna 202 then transmits the modulated RF signal based on the wireless network protocol in step 312. Antenna 202 may be able to actively transmit the modulated RF signal based on power derived from power circuit 206. Antenna 202 may alternatively reflect or backscatter the RF signal that is received from RF source 102 after it is modulated. Either way, the modulated RF signal is transmitted for reception by RF source 102 and/or RF device 105.

If the data is intended for RF source 102, then protocol element 212 may encode the data with an address (e.g., a MAC address) for RF source 102. When RF source 102 receives the modulated RF signal, RF source 102 extracts the encoded data from the modulated RF signal, and decodes the data. RF source 102 may process the decoded data to identify the destination address. If the destination address in the data matches the MAC address for RF source 102, then RF source 102 determines that it is the intended recipient for the data. RF source 102 may then handle the data in a desired manner.

If the data is intended for another passive RF device, such as RF device 105, then protocol element 212 may encode the data with an address (e.g., a MAC address) for RF device 105. The modulated RF signal from antenna 202 is then received in RF device 105, which processes the modulated RF signal similar to the way RF source 102 processes the RF signal as described above.

The use of the wireless network protocol in RFID system 100 allows for bi-directional communication between RF device 104 and RF source 102. For example, the wireless network protocol may specify request-response procedures for transmission of data or commands. One of the request-response procedures may be for RF source 102 to request the data from RF device 104. Therefore, before RF device 104 sends the encoded data to RF source 102, RF source 102 may request the data from RF device 104 based on the wireless network protocol. To do so, RF source 102 generates a request for the data stored on RF device 104, and encodes the request based on the wireless network protocol. The request may be for all data stored in RF device 104, or may indicate specific data being requested (e.g., by file name). RF source 102 then modulates the RF signal to include the encoded request. Antenna 202 in RF device 104 receives the RF signal from RF source 102, and circuitry 204 decodes the encoded request from the RF signal based on the wireless network protocol. In response to the request from RF source 102, circuitry 204 reads the requested data from memory 208, encodes the data based on the wireless network protocol, and modulates the RF signal to include the encoded data as described in FIG. 3 to provide the data to RF source 102.

Another one of the request-response procedures may be for RF source 102 to acknowledge receipt of the data from RF device 104. When RF source 102 successfully receives the data from RF device 104, RF source 102 generates an acknowledgement, and encodes the acknowledgement based on the wireless network protocol. RF source 102 then modulates the RF signal to include the encoded acknowledgement. Antenna 202 in RF device 104 receives the RF signal from RF source 102, and circuitry 204 decodes the encoded acknowledgement based on the wireless network protocol. Circuitry 204 may then process the acknowledgement from RF source 102 to determine that the data was successfully received in RF source 102. If the data was not successfully received, then circuitry 204 may retry transmission of the data.

Another one of the request-response procedures may be for RF device 104 to request that RF source 102 sustain the RF signal for a time period. Because RF device 104 is a passive device, it relies on the RF signal for power. If processor 210 in RF device 104 is tasked with performing a function, then it is preferred that the RF signal is available to power processor 210 for the duration of the task. Thus, processor 210 may request that RF source 102 sustain the RF signal for the duration of the task. To do so, circuitry 204 encodes a request to sustain the RF signal for a time period (e.g., the time period required to complete the function) based on the wireless network protocol. Circuitry 204 then modulates the RF signal to include the encoded request for transmission to RF source 102 through antenna 202. When RF source 102 receives the modulated RF signal, RF source 102 extracts the encoded request from the modulated RF signal, and decodes the request. RF source 102 determines that RF device 104 has requested that the RF signal be supplied for a time period, and maintains the RF signal for the requested time period so that RF device 104 may complete a task.

The request-response procedures in the wireless network protocol may allow for additional features in RFID system 100. For instance, RF source 102 may request particular data from RF device 104, may request when RF device 104 transmits the data, may request how often RF device 104 transmits the data, etc. RF device 104 may make similar requests to RF source 102.

The use of the wireless network protocol in RFID system 100 also allows for bi-directional communication between RF device 104 and other passive RF devices (e.g., RF device 105). Using the request-response procedures in the wireless network protocol, RF device 104 may request data from RF device 105, and vice-versa. For example, assume that RF device 105 requests data that is stored in RF device 104. To do so, RF device 105 generates a request for the data stored on RF device 104, and encodes the request based on the wireless network protocol. As with RF device 104, RF device 105 is powered from the RF signal provided by RF source 102. RF device 105 modulates the RF signal to include the encoded request, and transmits the modulated RF signal. Antenna 202 in RF device 104 receives the RF signal from RF device 105, and circuitry 204 decodes the encoded request based on the wireless network protocol. In response to the request from RF device 105, circuitry 204 reads the data from memory 208, encodes the data based on the wireless network protocol, and modulates the RF signal to include the encoded data as described in FIG. 3. Antenna 202 then transmits the modulated RF signal for reception by RF device 105. RF device 105 may then decode the data from the RF signal.

The use of a wireless network protocol in RFID system 100 (see FIG. 1) advantageously allows for improved communication between RF source 102 and RF devices 104-105. The wireless network protocol (through the RF signals) both powers RF devices 104-105, and allows for bi-directional communication (e.g., request-response procedures) between RF source 102 and RF devices 104-105. The data transmission is more secure and more reliable using the wireless network protocol. Also, RF devices 104-105 can communicate directly with access points or other protocol-compliant sources without the need for a dedicated RFID reader.

Figure 5:
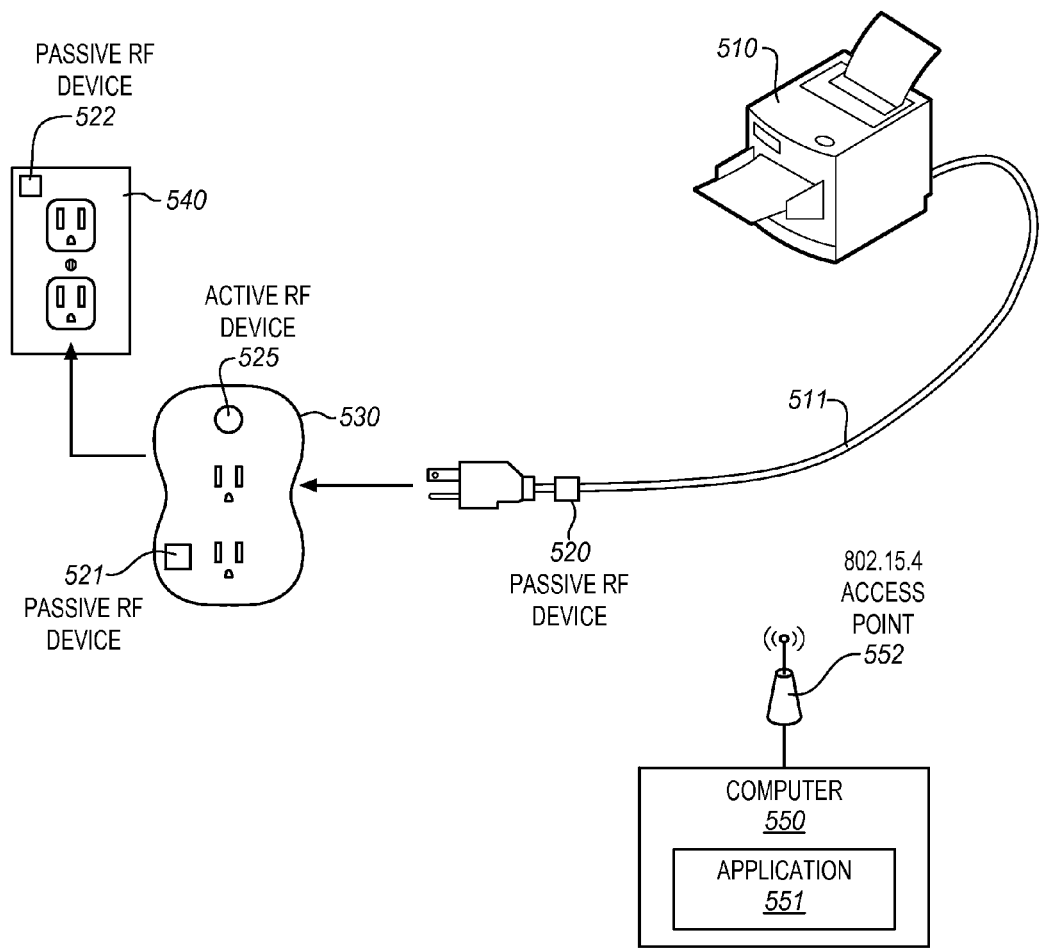
FIG. 5 illustrates an application of passive RF devices to monitor the power usage of an electrical device in an exemplary embodiment.

The passive RF devices described above may be used in a variety of applications. FIG. 5 illustrates an application of passive RF devices to monitor the power usage of an electrical device 510 in an exemplary embodiment. The electrical device 510 in FIG. 5 is illustrated as a printer just as an example, as electrical device 510 may include a computer, a television, a stove, a fan, or any other type of device that uses electricity. A passive RF device 520 is attached to power cord 511 of electrical device 510. The power cord 511 in turn is plugged into a power strip 530. Power strip 530 includes a passive RF device 521 and an active RF device 525. Power strip 530 is a smart power outlet, as it includes functionality for monitoring power usage of a device that is plugged into one of its outlets. One example of power strip 530 is a Modlet that is manufactured by ThinkEco. Power strip 530 is plugged into wall outlet 540 that includes a passive RF device 522.

Passive RF device 520 of power cord 511 is programmed with an ID for electrical device 510. The ID for electrical device 510 may include a serial number, a model number, and/or other information. Passive RF device 521 is programmed with an ID for power strip 530. The ID for power strip 530 may include a serial number, a model number, and/or other information. Passive RF device 522 is programmed with an ID for wall outlet 540. The ID for wall outlet 540 may include a location (e.g., room number, floor number, etc), a model number, and/or other information. This example will show how passive RF devices 520-522 communicate their stored IDs using a wireless network protocol so that the power usage of electrical device 510 may be monitored.

When power strip 530 is plugged into wall outlet 540, and power cord 511 is plugged into power strip 530, active RF device 525 is positioned very close (i.e., within inches) to each of the passive RF devices 520-522. Active RF device 525 acts as an RF source to transmit an RF signal based on the wireless network protocol. Assume for this example that the wireless network protocol is IEEE 802.15.4, but other protocols may be used in other embodiments.

Passive RF device 520 on power cord 511 receives the RF signal from active RF device 525, and derives power from the 802.15.4 RF signal. Because passive RF device 520 is located close to active RF device 525, passive RF device 520 is able to derive enough power to support a network-based protocol such as 802.15.4. With the power derived from the RF signal, passive RF device 520 reads the ID for electrical device 510 that is stored in memory, encodes the ID based on the 802.15.4 protocol, and modulates the RF signal to include the encoded ID. Passive RF device 520 then transmits the modulated RF signal based on the 802.15.4 protocol. The modulated RF signal is received in active RF device 525, which extracts and decodes the ID for electrical device 510 from the RF signal.

Passive RF device 521 on power strip 530 works in a similar manner to provide the ID for power strip 530. More particularly, passive RF device 521 receives the RF signal from active RF device 525, and derives power from the 802.15.4 RF signal. With the power derived from the RF signal, passive RF device 521 reads the ID for power strip 530 that is stored in memory, encodes the ID based on the 802.15.4 protocol, and modulates the RF signal to include the encoded ID. Passive RF device 521 then transmits the modulated RF signal based on the 802.15.4 protocol. The modulated RF signal is received in active RF device 525, which extracts and decodes the ID for power strip 530 from the RF signal. Because power strip 530 is able to determine power usage through each of its outlets, active RF device 525 may also determine the power usage of electrical device 510 over a time period.

Passive RF device 522 on wall outlet 540 works in a similar manner to passive RF devices 520-521 to provide the ID for wall outlet 540 to active RF device 525. Active RF device 525 then aggregates the ID for electrical device 510, the ID for power strip 530, the ID for wall outlet 540, and the power usage information. Active RF device 525 then transmits the aggregated information (e.g., an aggregated file) to computer 550 through a 802.15.4 access point 552. Computer 550 may then execute an application 551 that processes the IDs and the usage information to monitor the power load from electrical device 510. Application 551 may log how much power electrical device 510 draws over a time period to identify a peak power usage. Application 551 may log how much power electrical device 510 draws for a particular function or processing event. For example, if electrical device 510 is a printer as in FIG. 5, then application 551 may log how much power the printer draws when printing a document and encode that in the transmitted data.

The power monitoring described above may be expanded to multiple electrical devices and multiple wall outlets. Thus, a mesh network of passive RF devices may be formed to report IDs for each of the electrical devices. This allows for large scale monitoring of power usage, which is especially useful in large enterprises or campuses so that power consumption may be regulated or reduced.

Although specific embodiments were described herein, the scope of the invention is not limited to those specific embodiments. The scope of the invention is defined by the following claims and any equivalents thereof.

We claim:
1. A device comprising:
an antenna operable to receive a Radio Frequency (RF) signal from a RF source that transmits the RF signal based on a wireless network protocol; and
circuitry operable to derive power from the RF signal;
with the power derived from the RF signal, the circuitry is further operable to read data from a memory, to encode the data based on the wireless network protocol, and to modulate the RF signal to include the encoded data;
the antenna is further operable to transmit the modulated RF signal based on the wireless network protocol.

2. The device of claim 1 wherein:
the circuitry is further operable to encode the data, based on the wireless network protocol, with an address for the RF source.

3. The device of claim 1 wherein:
the circuitry is further operable to receive an acknowledgement from the RF source that is encoded based on the wireless network protocol, the acknowledgement indicating that the encoded data was received in the RF source.

4. The device of claim 1 wherein:
the circuitry is further operable to receive a request from the RF source that is encoded based on the wireless network protocol, the request being for the data stored in the memory;
the circuitry is further operable to read the data from the memory in response to the request.

5. The device of claim 1 wherein:
the circuitry is further operable to encode the data, based on the wireless network protocol, with an address for another passive Radio Frequency Identification (RFID) device.

6. The device of claim 1 wherein:
the circuitry is further operable to encode a request based on the wireless network protocol for the RF source, the request being to sustain the RF signal for a time period; and
the circuitry is further operable to modulate the RF signal to include the encoded request.

7. The device of claim 1 wherein:
the wireless network protocol is based on the IEEE 802.15.4 standard.

8. The device of claim 1 wherein:
the wireless network protocol allows for bi-directional communications between the device and the RF source.

9. A method of operating a passive Radio Frequency Identification (RFID) device, the method comprising:
receiving a Radio Frequency (RF) signal from a RF source that transmits the RF signal based on a wireless network protocol; and
deriving power from the RF signal;
with the power derived from the RF signal, the method further includes:
reading data from a memory;
encoding the data based on the wireless network protocol;
modulating the RF signal to include the encoded data; and
transmitting the modulated RF signal based on the wireless network protocol.

10. The method of claim 9 wherein encoding the data based on the wireless network protocol further comprises:
encoding the data, based on the wireless network protocol, with an address for the RF source.

11. The method of claim 9 further comprising:
receiving an acknowledgement from the RF source that is encoded based on the wireless network protocol, the acknowledgement indicating that the encoded data was received in the RF source.

12. The method of claim 9 further comprising:
receiving a request from the RF source, that is encoded based on the wireless network protocol, for the data stored in the memory; and
reading the data from the memory in response to the request.

13. The method of claim 9 wherein encoding the data based on the wireless network protocol further comprises:
encoding the data, based on the wireless network protocol, with an address for another passive RF device.

14. The method of claim 9 further comprising:
encoding a request based on the wireless network protocol for the RF source, the request being to sustain the RF signal for a time period; and
modulating the RF signal to include the encoded request.

15. The method of claim 9 wherein:
the wireless network protocol is based on the IEEE 802.15.4 standard.

16. The method of claim 9 wherein:
the wireless network protocol allows for bi-directional communications between the device and the RF source.

\* \* \* \* \*